(12) United States Patent
Lo Presti et al.

(10) Patent No.: US 11,298,900 B2
(45) Date of Patent: Apr. 12, 2022

(54) PROCESS AND PLANT FOR BUILDING TYRES

(71) Applicant: PIRELLI TYRE S.P.A., Milan (IT)

(72) Inventors: Gaetano Lo Presti, Milan (IT); Gianni Mancini, Milan (IT); Maurizio Marchini, Milan (IT); Gianni Portinari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 444 days.

(21) Appl. No.: 16/063,939

(22) PCT Filed: Nov. 30, 2016

(86) PCT No.: PCT/IB2016/057204
§ 371 (c)(1),
(2) Date: Jun. 19, 2018

(87) PCT Pub. No.: WO2017/115173
PCT Pub. Date: Jul. 6, 2017

(65) Prior Publication Data
US 2019/0210313 A1 Jul. 11, 2019

(30) Foreign Application Priority Data
Dec. 28, 2015 (IT) .................. 102015000088017

(51) Int. Cl.
*B29D 30/36* (2006.01)
*B29D 30/20* (2006.01)

(52) U.S. Cl.
CPC ............ *B29D 30/36* (2013.01); *B29D 30/20* (2013.01)

(58) Field of Classification Search
CPC .................. B29D 30/36; B29D 30/245; B29D 2030/2657; B29D 30/24; B29D 30/20
(Continued)

(56) References Cited

U.S. PATENT DOCUMENTS 3,674,604 A 7/1972 Gazuit
3,776,802 A 12/1973 Mallory et al.
(Continued)

FOREIGN PATENT DOCUMENTS

CN 1681642 A 10/2005
CN 105451978 A 3/2016
(Continued)

OTHER PUBLICATIONS

Screen captures from YouTube video clip entitled "How Its Made Car Tires", uploaded on Mar. 9, 2015 by user "How It's Made". Retrieved from Internet <https://www.youtube.com/watch?v=1o9mVZxoayA>. (Year: 2015).*
(Continued)

*Primary Examiner* — Robert C Dye
*Assistant Examiner* — Alexander D Booth
(74) *Attorney, Agent, or Firm* — Steinfl + Bruno LLP

(57) ABSTRACT

A carcass sleeve including a carcass ply and a pair of annular anchoring structures is fitted around a toroidal forming drum arranged in a first radially contracted operational condition. The carcass sleeve is toroidally shaped against a radially inner surface of an annular contrast element. The forming drum is positioned inside the carcass sleeve and is concurrently expanded towards a second operational condition. Upon reaching the second operational condition, the toroidally shaped carcass sleeve is coupled to the forming drum. The forming drum, coupled to the carcass sleeve, is adapted to be transferred in proximity of an application device of additional components externally to the carcass sleeve.

37 Claims, 9 Drawing Sheets

Figure 1:
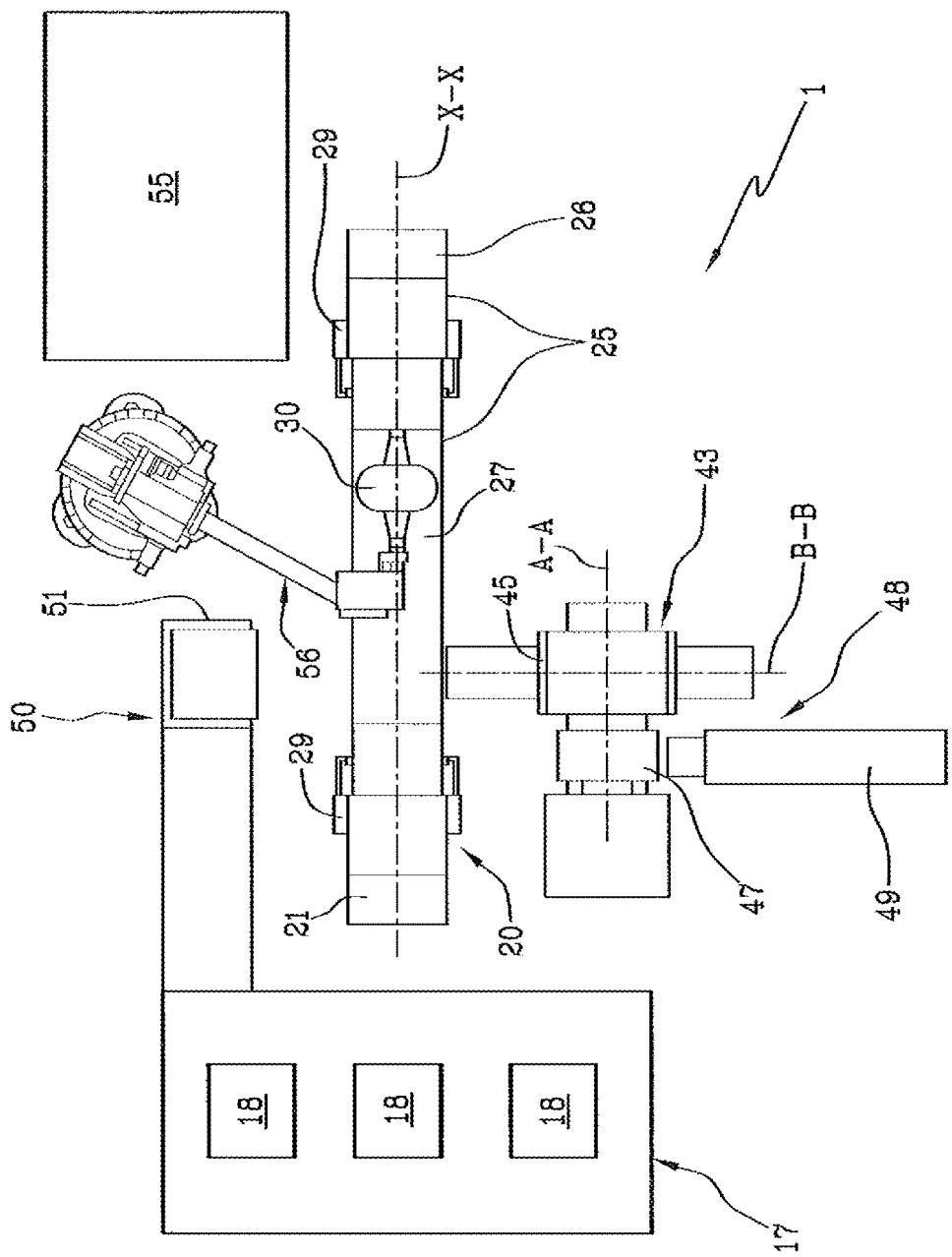

(58) Field of Classification Search
USPC .......................................................... 156/133
See application file for complete search history.

(56) References Cited

U.S. PATENT DOCUMENTS

| | | | |
|---|---|---|---|
| 3,822,165 A | 7/1974 | Habert et al. | |
| 3,867,230 A | 2/1975 | Van Horn et al. | |
| 4,769,104 A * | 9/1988 | Okuyama | B29D 30/3007 156/406.4 |
| 5,380,384 A * | 1/1995 | Tokunaga | B29D 30/2607 156/111 |
| 5,540,803 A * | 7/1996 | Miyamoto | B29D 30/005 156/396 |
| 5,635,016 A * | 6/1997 | Byerley | B29D 30/242 156/406.2 |
| 6,012,500 A | 1/2000 | Connor | |
| 6,234,227 B1 | 5/2001 | Bosseaux | |
| 7,931,768 B2 | 4/2011 | Seevers et al. | |
| 10,639,860 B2 | 5/2020 | Haupt et al. | |
| 2001/0000582 A1 | 5/2001 | Sergel et al. | |
| 2002/0050314 A1 | 5/2002 | Nakamura | |
| 2002/0062908 A1* | 5/2002 | Mancini | B29D 30/3007 156/130 |
| 2004/0123930 A1 | 7/2004 | Nakamura | |
| 2005/0126684 A1 | 6/2005 | Sieverding et al. | |
| 2006/0102272 A1 | 5/2006 | Iyanagi et al. | |
| 2006/0144490 A1 | 7/2006 | Tanaka | |
| 2007/0295442 A1 | 12/2007 | Minakawa | |
| 2008/0017298 A1 | 1/2008 | Iyanagi | |
| 2009/0020200 A1 | 1/2009 | Ogawa et al. | |
| 2009/0272484 A1* | 11/2009 | Seevers | B29D 30/2607 156/118 |
| 2010/0024959 A1 | 2/2010 | Mancini et al. | |
| 2011/0315294 A1 | 12/2011 | Misani et al. | |
| 2012/0049418 A1 | 3/2012 | Sano et al. | |
| 2013/0105068 A1 | 5/2013 | Wright et al. | |
| 2014/0034221 A1 | 2/2014 | Bignogno et al. | |
| 2014/0338818 A1 | 11/2014 | Otani et al. | |
| 2014/0345785 A1 | 11/2014 | Wang et al. | |
| 2015/0239190 A1* | 8/2015 | Currie | B29D 30/2607 156/417 |
| 2015/0273777 A1* | 10/2015 | Isaka | B29D 30/242 156/124 |
| 2016/0144583 A1 | 5/2016 | Mancini et al. | |
| 2016/0297158 A1 | 10/2016 | Haput et al. | |
| 2020/0247075 A1 | 8/2020 | Haupt | |

FOREIGN PATENT DOCUMENTS

| | | | | |
|---|---|---|---|---|
| EP | 1547757 A1 * | 6/2005 | ........... | B29D 30/245 |
| EP | 1547757 A1 | 6/2005 | | |
| EP | 1827808 B1 | 1/2009 | | |
| EP | 2014451 A1 | 1/2009 | | |
| EP | 2746037 A1 | 6/2014 | | |
| GB | 1487426 A | 9/1977 | | |
| JP | S57212046 A | 12/1982 | | |
| JP | 2005-246844 A | 9/2005 | | |
| JP | 2008521651 A | 6/2008 | | |
| JP | 2016537224 A | 12/2016 | | |
| RU | 2 455 165 C2 | 7/2012 | | |
| SU | 579880 A3 | 11/1977 | | |
| WO | 2004/041520 A1 | 5/2004 | | |
| WO | 2004/041522 A1 | 5/2004 | | |
| WO | 2013/091530 A1 | 6/2013 | | |
| WO | 2015/015336 A1 | 2/2015 | | |
| WO | 2015/079344 A1 | 6/2015 | | |
| WO | 2016/075576 A1 | 5/2016 | | |

OTHER PUBLICATIONS

Russian Office Action for RU Application No. RU2018126741 filed on Nov. 30, 2016 on behalf of Pirelli Tyre S.P.A. dated Mar. 13, 2020 13 pages (English + Original).
EPO Communication 94(3) for European Patent Application No. 14800142.3 filed May 10, 2016 on behalf of Pirelli Tyre S.P.A. dated Jul. 25, 2018. 5 pages.
Non-Final Office Action for U.S. Appl. No. 15/037,209, filed May 17, 2016 on behalf of Pirelli Tyre S.P.A. dated Aug. 2, 2018. 27 pages.
Office Action for Japanese Patent Application No. 2016-530960 filed May 13, 2016 on behalf of Pirelli Tyre S.P.A. dated Sep. 25, 2018. 7 pages. (English Translation + Japanese Original).
Office Action for Russian Patent Application No. 2016124106/05(037737) filed Oct. 24, 2014 on behalf of Pirelli Tyre S.P.A. dated May 29, 2018. 10 pages. (English Translation + Russian Original).
Final Office Action for U.S. Appl. No. 15/037,209, filed May 17, 2016, on behalf of Pirelli Tyre S.P.A. dated Jan. 15, 2019. 19 pages.
Office Action—Decision to Grant for Russian Patent Application No. 2016124106/05(037737), filed on Oct. 24, 2014, on behalf of Pirelli Tyre S.P.A. dated Oct. 29, 2018. 21 pages. Russian & English.
Notice of Allowance for U.S. Appl. No. 15/037,209, filed May 17, 2016, on behalf of Pirelli Tyre S.P.A. dated Dec. 30, 2019. 14 pages.
First Office Action for Chinese Application No. 201680080094 filed on Nov. 30, 2016 on behalf of Pirelli Tyre S.P.A dated Dec. 3, 2019 11 pages (English + Original).
Russian Official Decision of Grant for Russian Application No. RU2018126741 filed on Nov. 30, 2016 on behalf of Pirelli Tyre S.P.A. dated Jun. 19, 2020, 25 pages (English + Original).
International Search Report for PCT/IB2016/057204 filed Nov. 30, 2016 on behalf of Pirelli Tyre S.P.A. dated Apr. 19, 2017. 3 pages.
Written Opinion for PCT/IB2016/057204 filed Nov. 30, 2016 on behalf of Pirelli Tyre S.P.A. dated Apr. 19, 2017. 6 pages.
Restriction Requirement for U.S. Appl. No. 15/037,209, filed May 17, 2016 on behalf of Pirelli Tyre S.P.A. dated Mar. 27, 2018. 8 pages.
International Search Report for PCT/IB2014/065582 filed Oct. 24, 2014 on behalf of Pirelli Tyre S.P.A. dated Feb. 19, 2015. 6 pages.
Written Opinion for PCT/IB2014/065582 filed Oct. 24, 2014 on behalf of Pirelli Tyre S.P.A. dated Feb. 19, 2015. 9 pages.
Search Report for Italian Patent Application No. MI20131970 filed on Nov. 26, 2013 in the name of Pirelli Tyre S.P.A. dated May 14, 2014. 4 pages.
Written Opinion for Italian Patent Application No. MI20131970 filed on Nov. 26, 2013 in the name of Pirelli Tyre S.P.A. dated May 14, 2014. 7 pages. (English translation + Italian original).
First Office Action for Chinese Patent Application 201480064340.9 filed Oct. 24, 2014 on behalf of Pirelli Tyre S.P.A. dated Jul. 12, 2017. 30 pages. (English translation + Chinese original).
Japanese Notice of Reason for Rejection for Japanese Application No. 2018532299 filed on behalf of Pirelli Tire S.P.A. dated Jul. 31, 2020 18 pages (English + Original).
Second Chinese Office Action for Chinese Application No. 201680080094.5 filed on behalf of Pirelli Tyre S.P.A. dated Jul. 24, 2020 6 pages (English + Original).

* cited by examiner

PROCESS AND PLANT FOR BUILDING TYRES

CROSS REFERENCE TO RELATED APPLICATIONS

The present application is the U.S. National Stage of International Patent Application No. PCT/IB2016/057204 filed on Nov. 30, 2016 which, in turn, claims priority to Italian Application No. 102015000088017 filed on Dec. 28, 2015.

The present invention relates to a process and a plant for building tyres.

More particularly, the invention relates to the process and apparatus used for building green tyres, to be subsequently subjected to a vulcanisation cycle for obtaining the final product. A tyre for vehicle wheels generally comprises a carcass structure comprising at least one carcass ply having respectively opposite end flaps engaged with respective annular anchoring structures, integrated in the areas usually identified by the name of "beads", having an inner diameter substantially corresponding to a so-called "fitting diameter" of the tyre on a respective mounting rim.

The carcass structure is associated with a belt structure which may comprise one or more belt layers, arranged in radial superposition with respect to each other and with respect to the carcass ply, having textile or metallic reinforcing cords with crossed orientation and/or substantially parallel to the circumferential development direction of the tyre (at 0 degrees). A tread band is applied in a position radially outer to the belt structure, also made of elastomeric material like other semi-finished products making up the tyre.

Respective sidewalls of elastomeric material are further applied in an axially outer position on the lateral surfaces of the carcass structure, each extending from one of the lateral edges of the tread band up at the respective annular anchoring structure to the beads. In "tubeless" tyres, an airtight coating layer, usually called "liner", covers the inner surfaces of the tyre.

After the building of the green tyre, carried out by assembling respective components, a melding and vulcanisation treatment is generally carried out in order to determine the structural stabilisation of the tyre through cross-linking of the elastomeric compositions, as well as to impart a desired tread pattern onto the same, where required, and any distinguishing or information graphic signs at the tyre sidewalls.

The carcass structure and the belt structure are generally made separately of each other in respective work stations, to be mutually assembled at a later time.

More specifically, the manufacture of the carcass structure provides first that the carcass ply or plies are applied on a building drum, to form a so-called "carcass sleeve" substantially cylindrical. The annular anchoring structures to the beads are fitted or formed on the opposite end flaps of the carcass ply or plies, which are then looped back around the annular structures themselves so as to enclose them in a sort of loop.

A so-called "crown structure" is manufactured on a second drum or auxiliary drum in the shape of an outer sleeve comprising one or more belt layers applied in mutual radial superimposition, and optionally the tread band in a radially outer position to the belt layer(s). The crown structure is then picked up from the auxiliary drum to be coupled to the carcass sleeve. To this end, the crown structure is arranged coaxially around the carcass sleeve, after which the carcass ply or plies is/are shaped according to a toroidal configuration by mutual axial approach of the beads and concurrent introduction of fluid under pressure into the carcass sleeve, so as to cause a radial expansion of the carcass plies up to make them adhere against the inner surface of the crown structure.

The assembly of the carcass sleeve with the crown structure can be carried out on the same drum used to make the carcass sleeve, in which case it is called "single step building process" or "unistage process".

Building processes of the so-called "two-step" type are also known, in which a so-called "first-step drum" is first used to make the carcass sleeve, while the assembly between the carcass sleeve and the crown structure is carried out on a so-called "second-step drum" or "shaping drum", on which the carcass sleeve picked up from the first-step drum and then the crown structure picked up from the auxiliary drum are transferred.

The term "elastomeric material" is used to designate a composition comprising at least one elastomeric polymer and at least one reinforcement filler. Preferably, such composition further comprises additives such as, for example, a cross-linking agent and/or a plasticiser. Due to the presence of the cross-linking agent, such material can be cross-linked by heating, so as to form the final manufactured article.

Curvature ratio in relation to a tyre (or a portion thereof) means the ratio of the distance of the radially outer point of the tread band (or of the outer surface) from the line passing by the laterally opposite ends of the tread itself (or outer surface itself), measured on a radial plane of the tyre (or portion thereof) or on a plane containing the axis of rotation thereof (of the same), to the distance measured along the chord of the tyre (or portion thereof) between said ends.

Tyres for two-wheeled vehicles, in particular motor-cycles, are usually characterised by a relatively high curvature ratio, indicatively comprised between about 0.15 and about 0.45. In tyres for passenger cars, the curvature ratio instead takes relatively low values, indicatively comprised between 0 and 0.15. Curvature ratio in relation to a forming drum means the ratio of the distance of the radially outer point of the outer surface of the drum from the line passing by the laterally opposite ends of the drum itself, measured on a radial plane of the drum, or on a plane containing the axis of rotation of the same, to the distance measured along the chord of the drum between said ends.

In document WO 2004/041520, by the same Applicant, the shaping drum may be carried by a robotic arm which interacts with a transfer member bearing the belt structure taken from an auxiliary drum, to determine the coupling between the carcass structure and the belt structure. The robotic arm then carries the shaping drum in the vicinity of application devices of the tread band and/or the sidewalls comprising dispensing members arranged to deposit a continuous elongated element of elastomeric material on the mutually coupled carcass and belt structure.

Document WO 2004/041522 describes a further example in which a shaping drum carried by a robotic arm is moved to interact with devices which complete the building of the green tyre after determining the application of a belt structure previously formed on an auxiliary drum.

US 2009/0020200 describes the manufacture of a tyre for two-wheeled vehicles, in which a tread band is obtained by continuously winding a continuous elongated element of elastomeric material as a spiral in the circumferential direction of the tyre being processed, supported by a rigid drum whose outer surface profile copies the inner surface profile of the tyre being processed.

In order to improve the application of the belt structure, the same Applicant in WO 2015/079344 proposes a building process in which a carcass sleeve is placed in a radially outer position with respect to a toroidal forming drum arranged in a first radially contracted operational condition. The carcass sleeve is shaped according to a toroidal configuration while the forming drum is positioned inside the carcass sleeve. During the shaping of the carcass sleeve, the forming drum is expanded radially up to a second radially expanded operational condition. At the end of the shaping, the carcass sleeve is coupled to the forming drum in the second operating condition. The forming drum, coupled to said shaped carcass sleeve, is arranged in the vicinity of at least one device for building at least one belt layer in a position radially outer to said shaped carcass sleeve.

The Applicant has noted that the systems known for example from WO 2015/079344 provide appreciable operational flexibility in the manufacture of additional components such as tread band and sidewalls, which can be made directly on the carcass sleeve supported by the forming drum, after the application of the belt structure. However, the Applicant has noted that the engagement of a forming drum in the carcass sleeve being shaped allows obtaining particularly satisfactory qualitative results in relation to the production of tyres for motorcycles, typically having a relatively high curvature ratio. In the production of tyres with relatively small curvature ratio, such as those typically used on passenger cars, on the other hand, difficulties are observed in terms of quality and process repeatability.

In fact to this end, it has been noted that in the systems known for example from WO 2015/079344, the carcass sleeve being shaped, by effect of the inflation pressure, tends to assume a curvilinear profile in cross-section with a substantially constant radius. In other words, as an effect of the shaping, the carcass plies tend to assume an arched profile according to an arc of circumference, which gradually increases its curvature as the beads are moved close to one another.

This condition is optimal for the purposes of the manufacture of tyres having a high curvature ratio, typically adapted for example for use on motorcycles. In fact, in these cases, the forming drum has a relatively accentuated curvature profile in cross-section, consistent with that to be imparted to the tyre being processed, and the coupling with the carcass sleeve tends to occur substantially simultaneously and uniformly on the entire surface extension of the forming drum itself.

On the contrary, with the use of a forming drum suitable for processing tyres with small curvature ratio, for example adapted for use on passenger cars, it is rather difficult to obtain a correct coupling with the carcass sleeve.

The Applicant has in fact noted that the coupling tends to occur unevenly. More in particular, localised contacts occur between the carcass sleeve and the forming drum in areas mutually axially spaced apart, normally identified in the shoulder areas of the tyre (that is to say, the transition areas between the tread band and the sidewalls), when in the areas close to the equatorial plane, the carcass sleeve is still distant from the outer surface of the forming drum itself. Therefore, undesired relative frictions may occur in the coupling step between the carcass sleeve and the forming drum, and/or distortion of the carcass sleeve itself, with negative effects on the quality of the product which may also impair the structural integrity thereof.

The Applicant has therefore identified in the excessive difference between the curvature profile of the forming drum and the profile taken by the carcass sleeve in the shaping step, the origin of the problems encountered in the production of tyres with relatively small curvature ratio.

The Applicant has perceived that in order to obtain a qualitative improvement in the production of tyres, particularly with relatively small curvature ratio, it is desirable that the forming drum and the carcass sleeve being shaped maintain geometric features consistent with each other, such that the mutual coupling can take place evenly over the entire surface concerned, without causing mutual friction and/or structural distortions in the carcass sleeve.

According to the present invention, the Applicant has found that this result is effectively achieved by implementing a containment action on the carcass sleeve in the shaping step, such that the radial expansion according to an arched profile in cross section is inhibited in favour of a more flattened shaping profile consistent with the geometry of the forming drum preferably having a reduced curvature ratio.

More in particular, the present invention relates to a process for building tyres. Preferably, it is contemplated to arrange a carcass sleeve including at least one carcass ply and a pair of annular anchoring structures.

Preferably, it is contemplated to arrange a toroidal forming drum in a first radially contracted operational condition.

Preferably, it is contemplated to arrange said carcass sleeve in a position radially external to said forming drum.

Preferably, it is contemplated to toroidally shaping said at least one carcass sleeve against at least one radially inner surface of an annular contrast element, while said forming drum is positioned inside the carcass sleeve.

Preferably, it is contemplated to expand said forming drum up to a second radially expanded operational condition.

Preferably, it is contemplated to couple the toroidally shaped carcass sleeve to the forming drum in said second operational condition.

Preferably, it is contemplated to arrange said forming drum, coupled to said carcass sleeve in the proximity of at least one application device of additional components externally on said carcass sleeve.

According to a further aspect thereof, the invention relates to a plant for building tyres. Preferably, a shaping station is provided, including engagement devices of a carcass sleeve.

Preferably, shaping devices are provided, operating in the shaping station for shaping the carcass sleeve according to a toroidal configuration.

Preferably, an expandable toroidal forming drum is provided, engageable in the shaping station in a radially inner position in the carcass sleeve.

Preferably, actuator devices are provided, operating in the shaping station for radially expanding the forming drum inside the carcass sleeve.

Preferably, at least one work station for the application of additional components is provided.

Preferably, transfer devices are provided, configured for transferring the forming drum carrying said toroidally shaped carcass sleeve from the shaping station to said at least one application work station of additional components.

Preferably, containment devices are provided, operating in the shaping station for positioning at least one annular contrast element around the building drum and the carcass sleeve, operating against the carcass sleeve itself during the action of the actuator devices or the shaping devices.

The Applicant believes that during the shaping, the annular contrast element exerts a radial containment action on the carcass sleeve, applied around the circumferential extension, which allows adapting the shaping thereof according to the shape most suitable for coupling with the forming drum. It is in particular possible to arrange the carcass sleeve so that contact with the forming drum takes place simultaneously on a large surface extension, so as to complete the coupling without distortion of the carcass sleeve and/or frictions of the same on the forming drum. The additional tyre components, such as belt layers, sidewalls, tread band, further lend themselves to being made directly on the carcass sleeve already shaped according to a precise predefined profile, imposed by the geometric configuration of the forming drum, advantageously selectable according to the design parameters of the tyre being processed. The result is the achievement of a greater construction accuracy of said additional components and the positioning thereof with respect to the other constructional elements of the tyre. Moreover, great flexibility is achieved in the manufacture of multiple types of tyre different from one another in the composition and structure of the additional components. For example, tyres with tread band and/or sidewalls consisting each of one, two or more different parts, each formed with a specific elastomeric composition, may be built on a same plant.

In one or more of the above aspects, the invention further comprises at least one of the following features.

Preferably, it is further contemplated to arrange said annular contrast element in a radially outer position around said carcass sleeve, before shaping the carcass sleeve.

Preferably, said annular contrast element is arranged around the carcass sleeve after the forming drum has been coaxially inserted into the carcass sleeve itself.

The insertion of the carcass sleeve on the forming drum and in the annular contrast element is thus simplified without mutual interference.

Preferably, at least a part of the expansion of the forming drum is carried out concurrently with at least part of the shaping of the carcass sleeve.

Preferably, in said second operational condition, a radially outer surface of the forming drum acts in contact relation against a radially inner surface of the shaped carcass sleeve against the annular contrast element.

Preferably, the outer surface of the forming drum remains spaced from the carcass sleeve during the expansion of the forming drum, at least before reaching the second radially expanded operational condition.

Preferably, an outer surface of the forming drum reaches a contact relation against a radially inner surface of the carcass sleeve upon reaching said second operational condition.

The Applicant believes that by achieving the mutual contact between the forming drum and the carcass sleeve only when reaching the maximum expansion condition of the drum itself, the risk of relative frictions between the carcass sleeve and the forming drum is minimised.

Preferably, at the end of the shaping, an inner surface of the carcass sleeve reaches a maximum diameter greater than the maximum diameter reached by the outer surface of the forming drum in the second operational condition.

It is thus guaranteed that the expansion of the forming drum can take place in the absence of frictions against the carcass sleeve.

Preferably, upon reaching said second operational condition, a radially outer surface of the forming drum has, at least in an equatorial plane of the drum itself, a distance not greater than 2 mm from a radially inner surface of the shaped carcass sleeve against the annular contrast element.

The reduced distance between the carcass sleeve and the forming drum promotes a uniform mutual coupling and in the absence of frictions, following a slight contraction of the carcass sleeve.

Preferably, upon reaching said second operational conditions, a minimum distance between a radially outer surface of the forming drum and a radially inner surface of the shaped carcass sleeve against the annular contrast element is detectable at an equatorial plane of the forming drum.

Preferably, a radial expansion action of the annular contrast element carried out concurrently with the action of shaping the carcass sleeve is further contemplated.

Preferably, the radial expansion of the annular contrast element occurs through elastic deformation of the annular contrast element.

Preferably, the radial expansion of the annular contrast element occurs by the effect of a radial thrust exerted by the forming drum upon reaching the second operational condition.

Preferably, the annular contrast element comprises at least one transfer ring.

Preferably, said transfer ring is movable along a first translation axis and a second translation axis respectively perpendicular.

Preferably, said transfer ring internally carries a plurality of pads circumferentially distributed and radially movable between a release condition and a gripping condition in which they are radially contracted.

Preferably, the annular contrast element comprises at least one belt layer.

It is therefore possible to obtain the assembly of the carcass sleeve with the belt structure, or part thereof, simultaneously with the coupling of the forming drum with the carcass sleeve itself, thereby improving the production efficiency and simplifying the production plants.

Preferably, the annular contrast element comprises at least one belt layer engaged within a transfer ring.

Preferably, it is further contemplated to arrange said annular contrast element by the actions of: forming at least one belt layer around an auxiliary drum; engaging a transfer ring around said at least one belt layer; translating said transfer ring for removing said at least one belt layer from the auxiliary drum and position it around the carcass sleeve.

Preferably, the action of forming said belt layer includes wrapping a band-like semi-finished product circumferentially around said auxiliary drum and butt-jointing opposite ends of said band-like semi-finished product.

The production and the coupling of the belt structures on the carcass sleeve can therefore be obtained by using conventional equipment, widely tested and without major plant investments. In particular, the use of an auxiliary drum allows making the belt structure on a geometrically precise cylindrical reference.

Preferably, said application device of additional components is installed in a green tyre completion line remote with respect to said shaping station.

Preferably, said additional components include at least one belt layer applied in a radially outer position on the carcass sleeve.

Preferably, said belt layer is made by the sequential application of a plurality of strip-like elements consecutively arranged adjacent around the circumferential development of the carcass sleeve.

The Applicant believes that this allows obtaining greater production flexibility together with a high quality degree of the final product.

Preferably, said additional components include at least one tread band applied in a radially outer position to the carcass sleeve.

Preferably, the tread band is made by winding with at least one continuous elongated element of elastomeric material according to circumferential covering turns consecutively arranged adjacent around a radially outer surface of said carcass sleeve.

Preferably, said additional components include at least one sidewall applied laterally against the carcass sleeve.

Preferably, the sidewall is made by winding with at least one continuous elongated element of elastomeric material according to circumferential covering turns consecutively arranged adjacent against a lateral surface of said carcass sleeve.

Preferably, the carcass sleeve is made in at least one building station and subsequently transferred to a shaping station.

Preferably, the shaping of the carcass sleeve is carried out by introducing an inflating operating fluid inside the carcass sleeve.

Preferably, the shaping of the carcass sleeve occurs through mutual approach of a pair of flange elements coaxially facing each other and operationally engaging respective annular anchoring structures carried by respective axially opposite ends of the carcass sleeve.

Preferably, the carcass sleeve is coaxially fitted around the forming drum arranged in the shaping station.

Preferably, fitting the carcass sleeve around the forming drum includes: positioning the flange elements in a loading/unloading condition in which they are mutually spaced by an extent greater than an axial dimension of the unshaped carcass sleeve; engaging the forming drum coaxially to one of said flange elements; positioning the carcass sleeve coaxially between the flange elements; axially translating the carcass sleeve to arrange it in an axially centred position with respect to the forming drum.

Preferably, arranging said annular contrast element in a radially outer position around the carcass sleeve includes the following actions: positioning said annular contrast element coaxially between the flange elements; axially translating the annular contrast element to move it to a stand-by position laterally arranged with respect to said flange elements.

Preferably, the annular contrast element is positioned coaxially to the flange elements laterally with respect to the forming drum, and axially translated away from the forming drum.

Preferably, said annular contrast element has an inner diameter smaller than an outer diameter that would be taken by the carcass sleeve on the action of the actuator devices in the absence of the annular contrast element.

Preferably, said annular contrast element has an inner diameter substantially equal to an outer diameter of the forming drum in an expanded condition, added to twice the thickness of a radially outer portion of the shaped carcass sleeve.

Preferably, the forming drum in a first radially contracted operational condition has a maximum outer diameter smaller than a minimum inner diameter of the carcass sleeve.

Preferably, the forming drum includes a central shaft and a plurality of sectors circumferentially distributed around the central shaft and movable from a first operational condition, in which said sectors are adjacent the central shaft, to a second operational condition in which said sectors are moved away from the central shaft.

Preferably, said engagement devices include a pair of flange elements coaxially facing each other and operationally engageable with respective annular anchoring structures carried by respective axially opposite ends of the carcass sleeve.

Preferably, a carriage is further included, carrying one of said flange elements and movable towards the other flange element for switching the shaping station between a loading/unloading condition, in which the flange elements are mutually spaced by an extent greater than an axial dimension of the unshaped carcass sleeve and a working condition in which the flange elements are mutually spaced by an extent substantially corresponding to the axial dimension of the carcass sleeve.

Preferably, in the loading/unloading condition, the flange elements are mutually spaced by an extent at least twice the axial dimension of the unshaped carcass sleeve.

Preferably, said annular contrast element is radially movable to fit between the flange elements arranged in the loading/unloading condition.

Preferably, said annular contrast element is movable coaxially to the forming drum, between a working position axially interposed between the flange elements, and a stand-by position laterally arranged with respect to said flange elements.

Preferably, the forming drum in the second operational condition has a curvature ratio of between about 0 and about 0.15.

Further features and advantages will become more apparent from the detailed description of a preferred but non-exclusive embodiment of a method, a process and a plant for building tyres according to the present invention.

Figure 2:
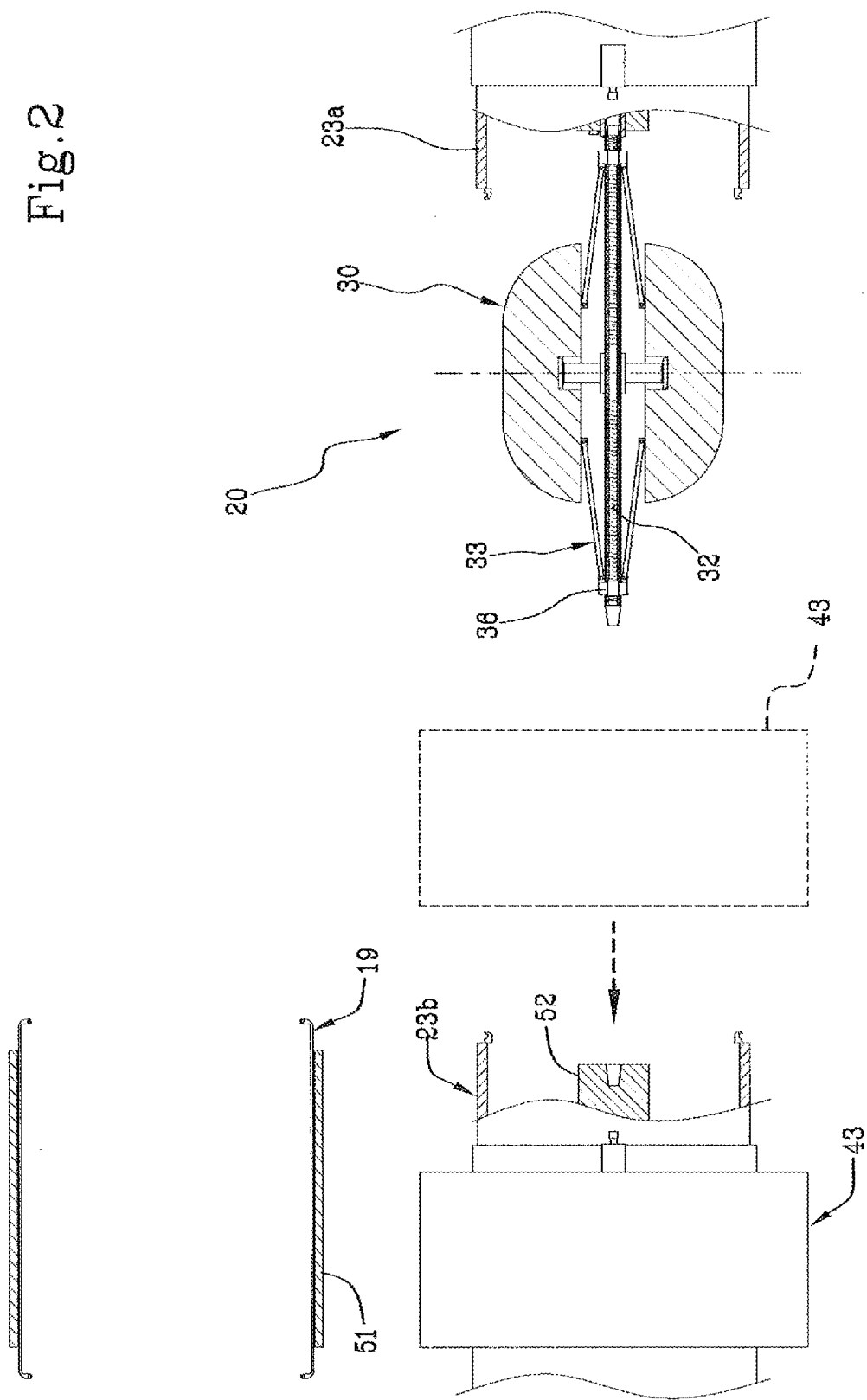
Figure 3:
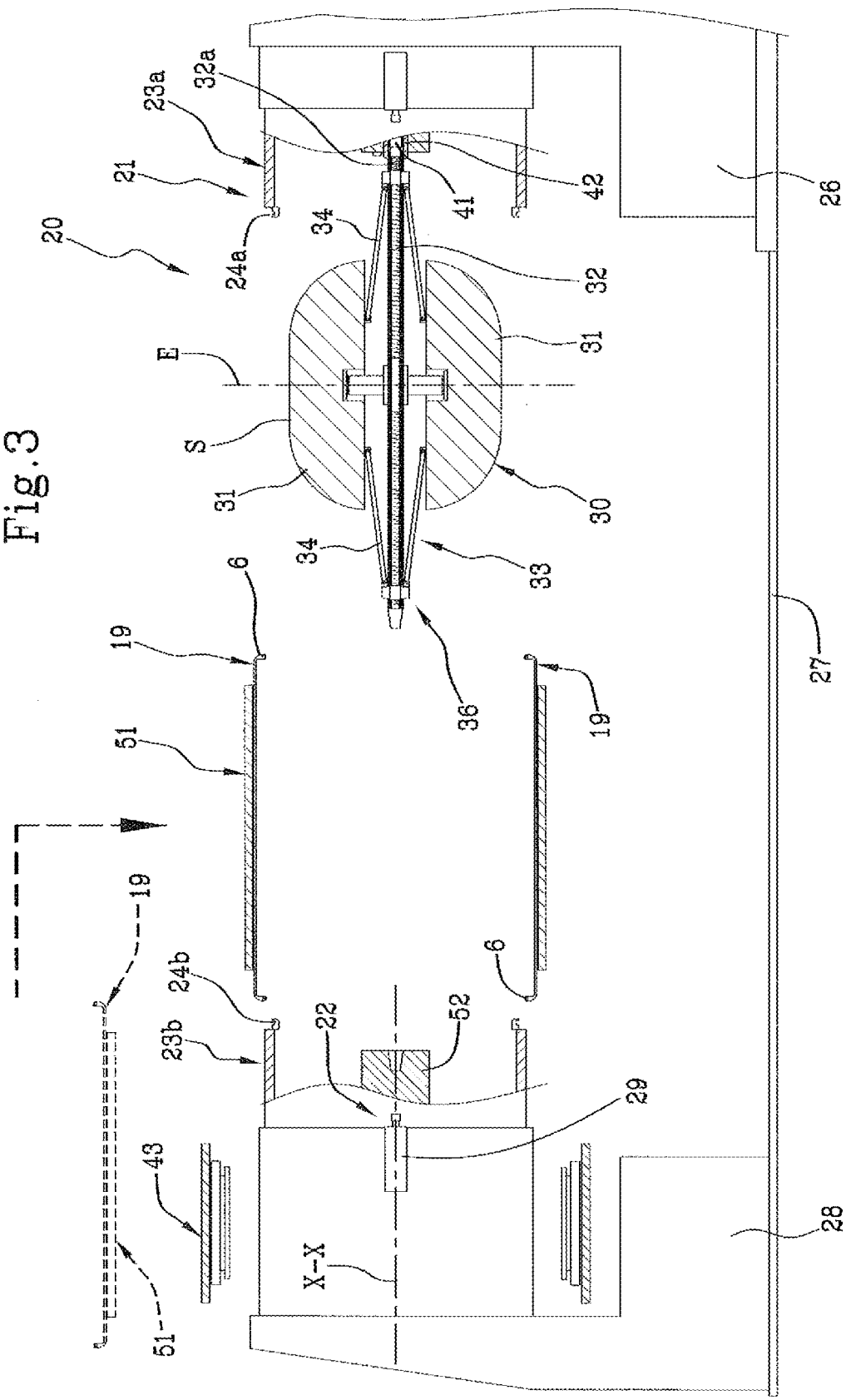
Figure 4:
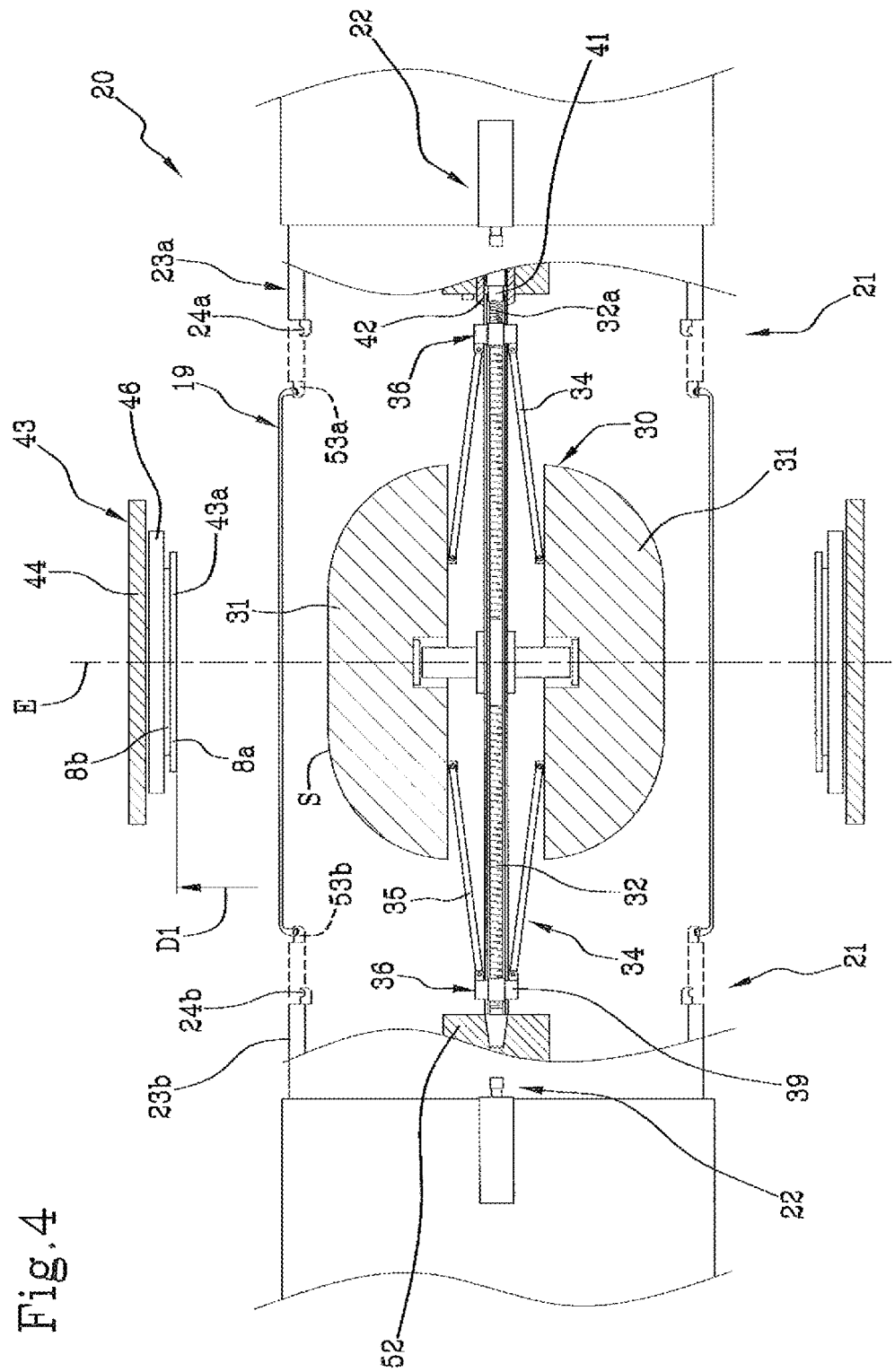
Figure 5:
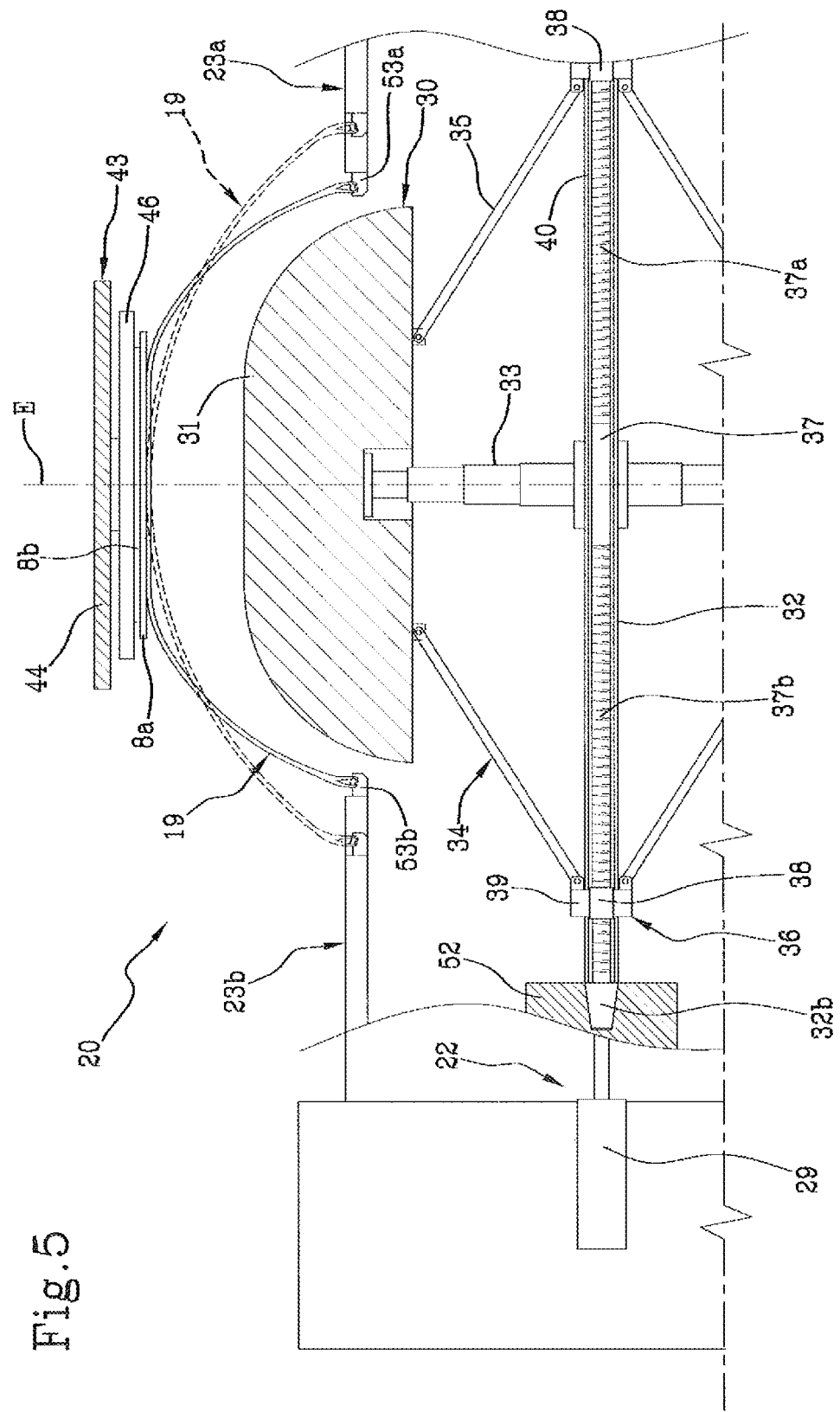
Figure 6:
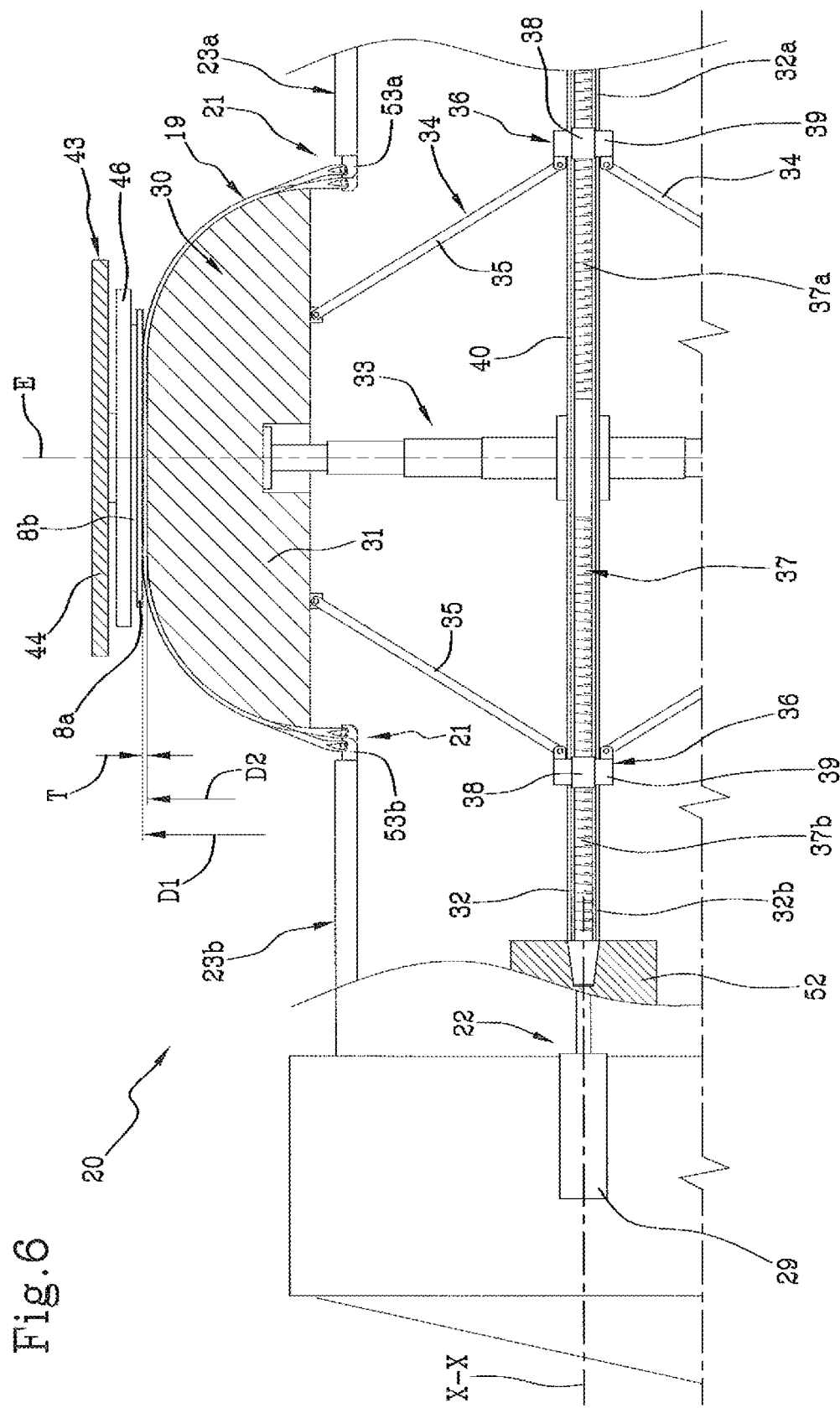
Figure 7:
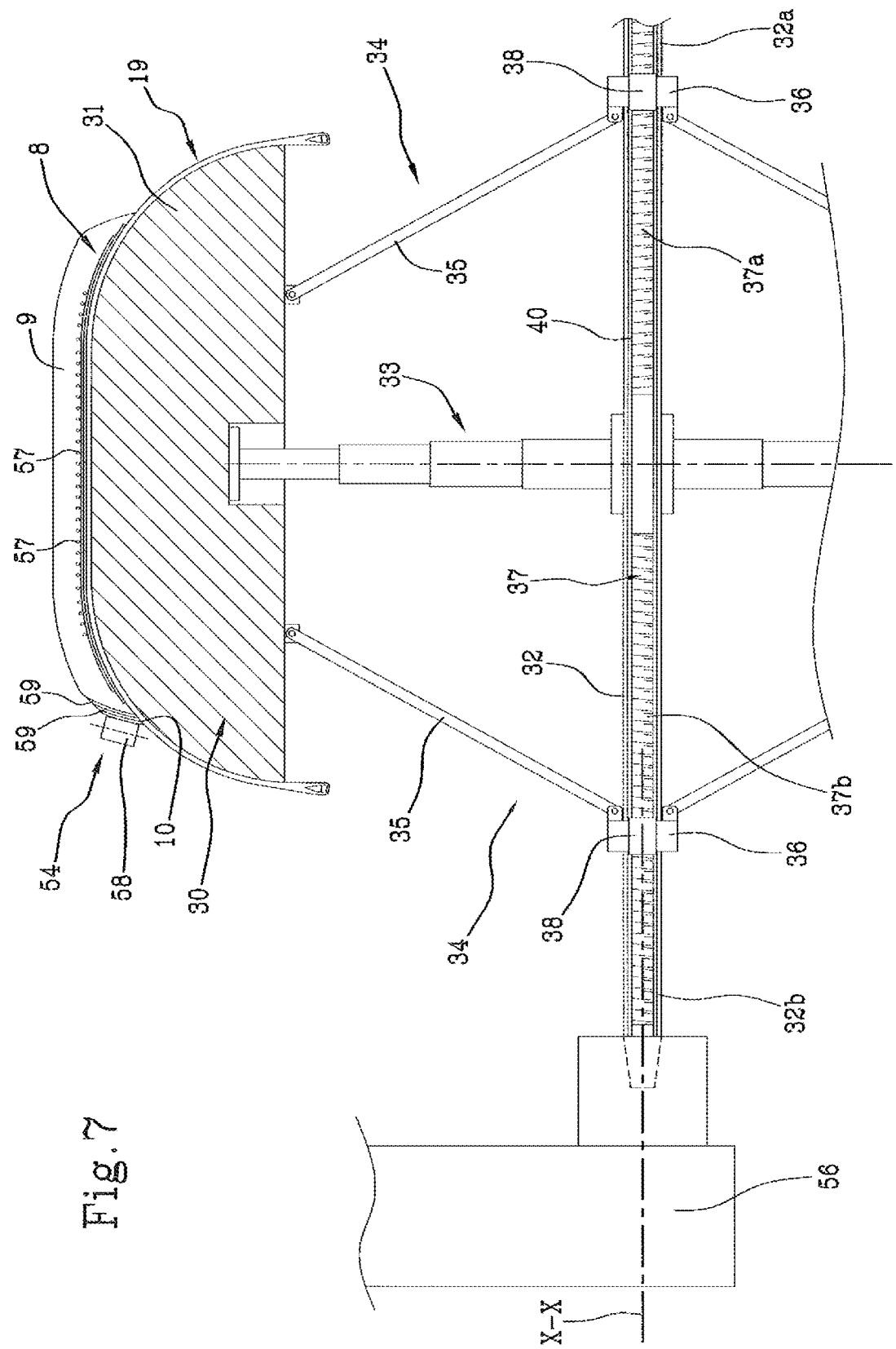
Figure 8A:
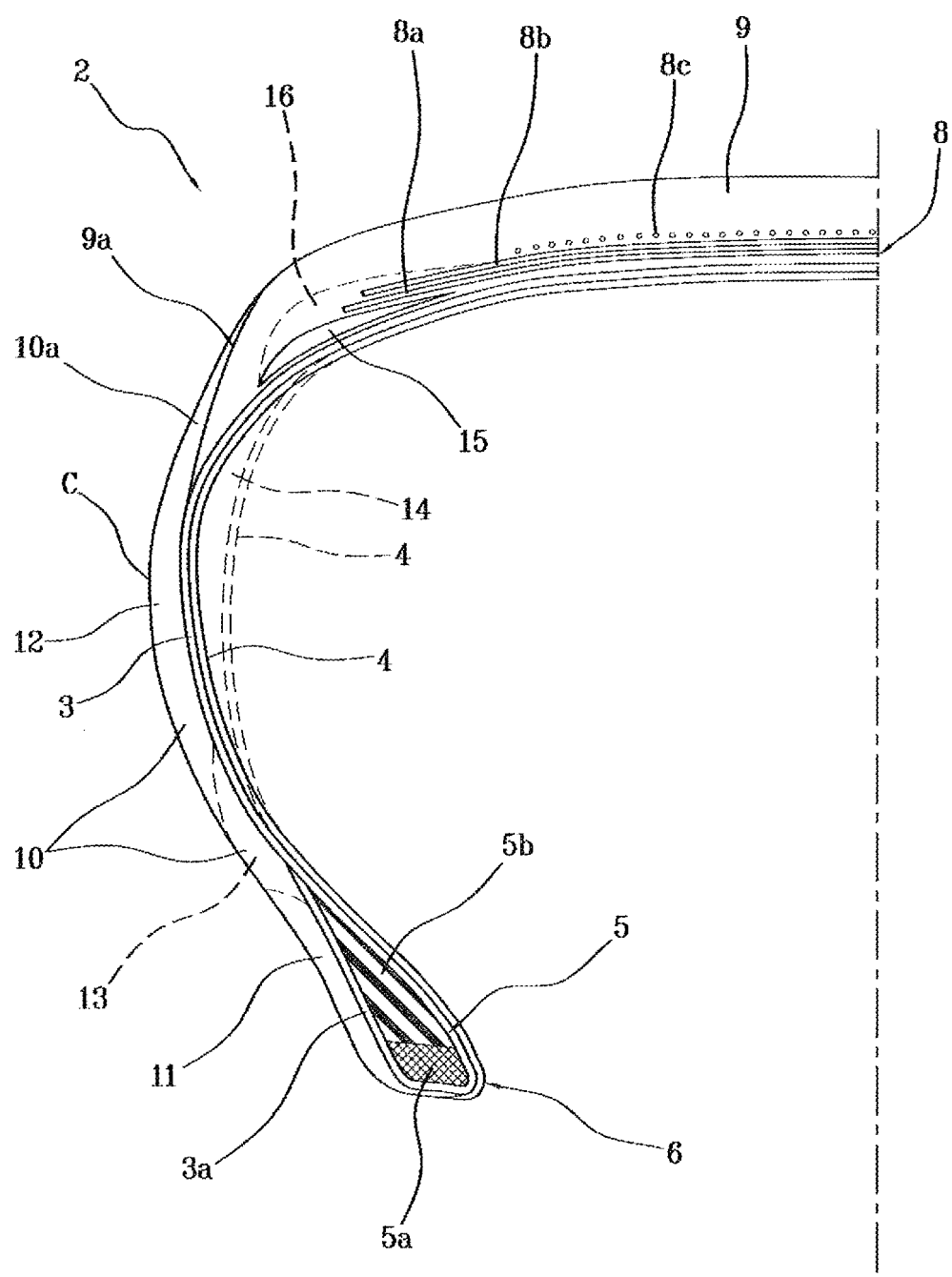
Figure 8B:
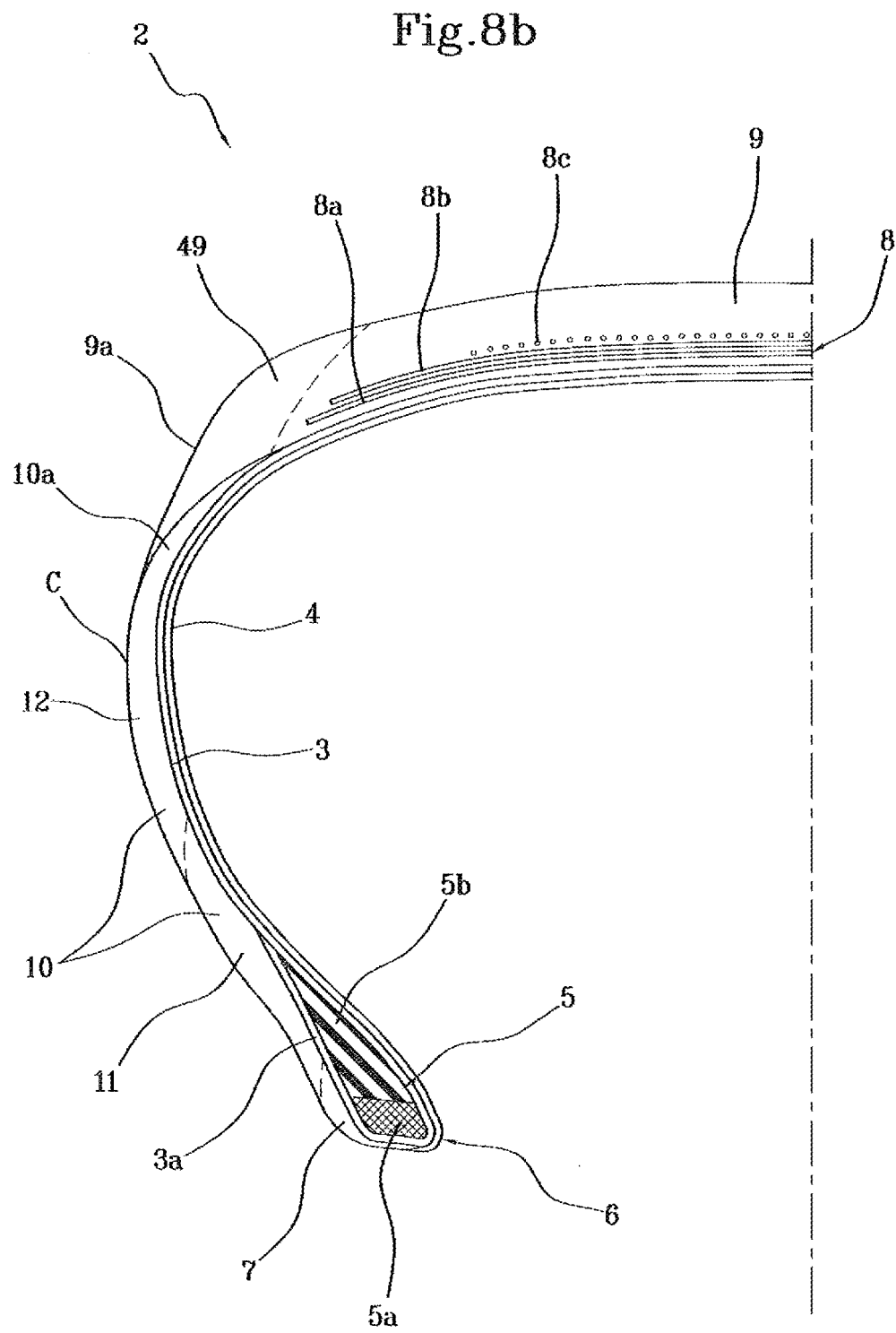

Such description is given hereinafter with reference to the accompanying drawings, provided only for illustrative and, therefore, non-limiting purposes, in which:

FIG. 1 schematically shows a top view of a plant for building tyres according to the present invention;

FIG. 2 schematically shows a lateral partially sectional view of the positioning of an annular contrast element in a shaping station;

FIG. 3 schematically shows a lateral partially sectional view of the loading of a carcass sleeve in the shaping station;

FIG. 4 schematically shows a lateral partially sectional view of the insertion of a forming drum in the carcass sleeve arranged in the shaping station;

FIG. 5 schematically shows a lateral partially sectional view of an intermediate step of the shaping of the carcass sleeve;

FIG. 6 schematically shows a lateral partially sectional view of a final step of the shaping of the carcass sleeve;

FIG. 7 shows the application of an additional component on the shaped carcass sleeve coupled to a forming drum;

FIGS. 8a and 8b schematically show a radial half-section view of respective exemplary embodiments of tyres that can be obtained according to the present invention.

With reference to the above figures, reference numeral 1 generally identifies a plant for building tyres for vehicle wheels designed to implement a process according to the present invention.

Plant 1 is designed to manufacture tyres 2 (FIGS. 8a, 8b) essentially including at least one carcass ply 3 preferably internally coated with a layer of impermeable elastomeric material or so-called liner 4. Two annular anchoring structures 5 comprising each a so-called bead core 5a preferably bearing an elastomeric filler 5b in radially outer position are engaged to respective end flaps 3a of the carcass ply or plies 3. The annular anchoring structures 5 are integrated in the proximity of zones usually identified by the name of "beads"

6, at which the engagement between tyre 2 with a respective mounting rim (not shown) usually occurs.

Each of beads 6 may optionally be associated with an anti-abrasive insert 7 (FIG. 4) which externally covers the respective annular anchoring structure 5.

A belt structure 8 comprising one or more belt layers 8a, 8b, 8c is circumferentially applied around the carcass ply/plies 3, and a tread band 9 is arranged in a radially outer position to the belt structure 8.

Two sidewalls 10, each extending from a corresponding bead 6 up to the proximity of a corresponding axially outer edge 9a of the tread band 9, are applied at laterally opposite positions on the carcass ply/plies 3.

Each of sidewalls 10 may comprise a radially inner portion 11 extending from the corresponding bead 6, and a radially outer portion 12 joining with one of the axially outer edges 9a of the tread band 9.

In addition or as an alternative to the radially inner portion 11 of each sidewall 10, at least one elastomeric reinforcement element 13 may be applied in the proximity of each of the annular anchoring structures 5, joining with the respective radially outer portion 12 and preferably having a modulus of elasticity greater than a modulus of elasticity of the radially outer portion itself. Optionally, it may be contemplated that each radially outer portion 12 fully covers an axially outer side of the respective elastomeric reinforcement element 13.

Sidewall reinforcement inserts 14 may be further optionally provided, applied in an axially inner position to the carcass ply/plies 3 and extending each from the corresponding bead 6.

In the example in FIG. 8a, the radially outer apices 10a of sidewalls 10 are superimposed to the axially outer edges 9a of the tread band 9 according to a SOT construction scheme.

In the example in FIG. 8b, axially outer edges 9a of the tread band 9 are superimposed to radially outer apices 10a of the respective sidewalls 10, according to a TOS construction scheme. At least one so-called belt under-layer (not shown in the accompanying drawings), made of elastomeric material, may be interposed between the carcass ply/plies 3 and the belt structure 8.

Respective annular under-belt inserts 15 made of elastomeric material and axially spaced from each other, may be interposed between the carcass ply/plies 3 and the axially opposite edges of the belt structure 8.

The under-belt inserts 15 may be optionally associated with respective covering portions 16 so as to form, together with the under-belt inserts 15 themselves, so-called "cushion inserts" arranged each astride of the respective edge of the belt structure 8.

Plant 1 includes a carcasses building line 17 having one or more building stations 18 where, for example according to known methods, a carcass sleeve 19 having substantially cylindrical shape is built. The carcass sleeve 19 includes said at least one carcass ply 3, preferably internally lined by liner 4, and having the respective end flaps 3a engaged, for example through looping back, to the respective annular anchoring structures 5. On occurrence, the carcass sleeve 19 may also include sidewalls 10 or first portions of the same, extending each starting from the respective bead 6. The anti-abrasive inserts 7 and/or the elastomeric reinforcement elements 13 may be further applied on the carcass sleeve 19.

The carcass building line 17 ends with a shaping station 20 including engagement devices 21 of the carcass sleeve 19 and shaping devices 22, on the action of which the carcass sleeve 19 is shaped according to a toroidal configuration.

The engagement devices 21 include for example a first flange element 23a and a second flange element 23b, coaxially facing each other and having respective circumferential engagement seats 24a, 24b, whereby they can be operationally engaged each at one of the annular anchoring structures 5 respectively carried by the axially opposite ends of the carcass sleeve 19.

The engagement devices 21 may further include axial movement elements 25 of the flange elements 23a, 23b. More in detail, it may be contemplated that at least one of the flange elements 23a, 23b, such as the first flange element 23a, is carried by a carriage 26 movable along one or more linear guides 27, parallel to a geometric axis X-X of mutual alignment between the flange elements 23a, 23b and preferably integral with respect to a fixed base 28, integral with the second flange element 23b. Moving carriage 26 along the linear guides 27 switches the shaping station 20 between a loading/unloading condition and a working condition. In the loading/unloading condition (FIGS. 2 and 3), the first flange element 23a is spaced apart from the second flange element 23b by a greater extent, approximately at least twice, with respect to an axial dimension of the unshaped carcass sleeve 19, arriving from the carcass building line 17. In working condition, the flange elements 23a, 23b, and more specifically the respective circumferential engagement seats 24a, 24b, are mutually spaced apart by an extent substantially corresponding to the axial dimension of the carcass sleeve 19.

The shaping devices 22 may for example include a fluid dynamic circuit (not shown) to introduce air under pressure or other operating swelling fluid between the flange elements 23a, 23b, inside the carcass sleeve 19.

The shaping devices 22 may further include one or more linear actuators or other axial movement devices 29 operating on one or preferably both flange elements 23a, 23b for axially moving them toward each other starting from said working conditions. The reciprocal approach of the flange elements 23a, 23b causes a mutual approaching of the annular anchoring structures 5 so as to allow the shaping of the carcass sleeve 19 according to a toroidal configuration, assisted by the simultaneous introduction of the pressurised operating fluid into the carcass sleeve 19.

In the shaping station 20, the shaped carcass sleeve 19 is coupled to a toroidal rigid and expandable forming drum 30, arranged within the carcass sleeve itself.

The forming drum 30 is expandable from a first radially contracted operational condition (FIGS. 2 to 4) and a second radially expanded operational condition (FIGS. 6 and 7). To this end, it may for example be contemplated that the forming drum 30 includes a plurality of sectors 31 circumferentially distributed around a central shaft 32. Sectors 31 are movable, preferably simultaneously, from said first operational condition in which they are close to the central shaft 32, to the second operational condition in which said sectors 31 are moved away from the central shaft 32. To this end, it may be contemplated that sectors 31 are carried by respective telescopically extendable guiding members 33, extending radially from the central shaft 32.

The movement of sectors 31 may be achieved for example by means of return mechanisms 34, for example including control levers 35 hinged, each at respectively opposite ends thereof, to one of said sectors 31 and at least one control collar 36 slidably fitted along the central shaft 32. More in particular, a pair of control collars 36 are preferably provided, arranged along the central shaft 32 in axially opposite positions with respect to sectors 31, engaging each respective control levers 35.

Each control collar 36 is operationally connected to a threaded bar 37, rotatably engaged coaxially within the central shaft 32. The threaded bar 37 extends along the central shaft 32, almost by the full length of the same or beyond, and bears two axially opposite threads 37a, 37b, respectively right-handed and left-handed. Respective nut screws 38 are operatively engaged on threads 37a, 37b, axially movable within the central shaft 32 and connected each to one of the control collars 36, for example by at least one block 39 radially crossing the central shaft 32 at a longitudinal slit 40.

The rotation of the threaded bar 37 in the central shaft 32, which can be carried out by means of a rotary feeder or other actuating devices 41 of a different type operating in the shaping station 20, causes an axial movement of the nut screws 38 and of the control collars 36, which corresponds to a radial movement of sectors 31, toward the first or the second operational condition according to the direction of rotation of the threaded bar 37.

In the second operational condition, the set of sectors 31 of the forming drum 30 defines, along its circumferential extension, a radially outer surface S substantially toroidal, not necessarily continuous, shaped according to the inner configuration that at least a part of the carcass sleeve 19 must take after shaping. More in detail, it may be advantageously contemplated that the forming drum 30 in the second operational condition defines, at least in the proximity of a radially outer portion thereof, a curvature ratio of between about 0 and about 0.15 typically adapted to make tyres for cars, trucks or other four-wheeled vehicles.

Preferably, the forming drum 30 is placed in the shaping station 20 before the respective carcass sleeve 19, for example still being processed along the carcass building line 17, reaches the shaping station itself. More in particular, it is preferably contemplated that the forming drum 30 is supported cantilevering in the shaping station 20. For example, a first end 32a of the central shaft 32 of the forming drum 30 may to this end be retained by a mandrel 42 coaxially housed in the first flange element 23a and provided with said rotary feeder 41 which can be coupled with the threaded bar 37 to actuate it in rotation.

The forming drum 30 may therefore be arranged in the first operational condition by said rotary feeder 41, if it is not already in such a configuration upon reaching the shaping station 20. The shaping station 20 is also operationally associated with at least one annular contrast element 43 bearing at least one radially inner surface 43a which is designed to operate against the carcass sleeve 19 itself during the action of the actuating devices 41.

The annular contrast element 43 can for example include at least one transfer ring 44. The transfer ring 44 is preferably carried by a respective carriage 45 movable along a first translation axis A-A and a second translation axis B-B respectively perpendicular. The first translation axis A-A is preferably parallel to the geometric axis X-X and the second translation axis B-B is preferably perpendicular to the geometric axis X-X. The transfer ring 44 internally bears a plurality of plates 46 circumferentially distributed and radially movable between a release condition, in which they are radially expanded, and a gripping condition in which they are radially contracted. In a possible exemplary embodiment, the radially inner surface 43a of the annular contrast element 43 may be defined by plates 46 and optionally have a discontinuous pattern.

In addition or in alternative to the transfer ring 44, the annular contrast element 43 may include at least one of the belt layers 8a, 8b, 8c to be associated to tyre 2 being processed. In this case, a first radially innermost belt layer 8a defines the radially inner surface 43a of the annular contrast element 43 intended to interact with the carcass sleeve 19.

To this end, at least part of the belt structure 8 may be made on a contractible auxiliary drum 47, at a belt building work station 48 adjacent to the shaping station 20. To this end, for example, it is contemplated that at least one of the belt layers 8a, 8b, 8c, preferably the first and a second belt layer 8a, 8b, are made each by circumferentially wrapping a band-like semi-finished product circumferentially around the auxiliary drum 47 and butt-jointing opposite ends of said semi-finished product.

The transfer ring 44 is then engaged around the belt layer or layers 8a, 8b formed on the auxiliary drum 47 to engage them following a movement of plates 46 in the gripping condition, simultaneously with a radial contraction of the auxiliary drum 47. The transfer ring 44 can then be moved along the first translation axis A-A to remove the belt layers 8a, 8b from the auxiliary drum 47. With a radial displacement along the second translation axis B-B, the annular contrast element 43 is positioned coaxially between the flange elements 23a, 23b arranged in the loading/unloading condition, lateral to the forming drum 30, as shown with a dashed line in FIG. 2. A new movement along the first translation axis A-A, preferably away from the forming drum 30, moves the annular contrast element 43 to a stand-by position laterally arranged with respect to the flange elements 23a, 23b. For example, in the stand-by position, the annular contrast element 43 may be arranged around the second flange element 23b (FIGS. 2 and 3).

The annular contrast element 43 may thus be arranged in the shaping station 20 without hindering access to the carcass sleeve 19. By means of carcass loading devices 50, the carcass sleeve 19 arriving from the carcass building line 17 is then introduced into the shaping station 20 to be coaxially arranged in radially outer position around the forming drum 30 arranged in the first radially contracted operational condition.

The carcass loading devices 50 may for example include a carcass manipulator 51 preferably operating on an outer surface of the carcass sleeve 19. With a radial translation movement (with respect to the forming drum 30), the carcass sleeve 19 is first introduced, in axial alignment relation with the forming drum 30, between the flange elements 23a, 23b arranged in the loading/unloading condition (FIG. 3). The carcass sleeve 19 is then arranged around the forming drum 30, preferably following an axial translation movement of the forming drum 30 itself (FIG. 4). More in particular, with a movement of carriage 26 along the linear guides 27, the forming drum 30 is coaxially inserted into the carcass sleeve 19. Once the translation of carriage 26 and of the forming drum 30 has finished, a second end 32b of the central shaft 32 can be engaged, optionally with the aid of the axial movement devices 29, with a tailstock 52 arranged within the second flange element 23b.

For the axial movement of the forming drum 30 with respect to the carcass sleeve 19 to take place without mutual mechanical interferences, it is preferably provided that in the first operational condition, the forming drum 30 has a maximum outer diameter smaller than a minimum inner diameter of the carcass sleeve 19, typically found at beads 6.

At the end of the axial movement, each of the annular anchoring structures 5 integrated in beads 6 is arranged in axially inner position with respect to the circumferential engagement seat 24a, 24b of the respective first and second flange element 23a, 23b.

On the action of the axial movement devices 29, the flange elements 23a, 23b therefore move the respective engagement seats 24a, 24b substantially in radial alignment relation within the annular anchoring structures 5.

Each of said flange elements 23a, 23b includes expansion members (not shown) configured to cause a radial expansion of respective circumferential sealing rings 53a, 53b integrating the circumferential engagement seats 24a, 24b. Following such a radial expansion, each of the circumferential sealing rings 53a, 53b is brought to act in thrust relation against one of the annular anchoring structures 5. The carcass sleeve 19 is thus firmly constrained to the flange elements 23a, 23b. Once the engagement has taken place, the carcass manipulator 51 can release the carcass sleeve 19 and move it away from the shaping station 20.

With a movement along the first translation axis A-A, the annular contrast element 43 can thus be moved from the stand-by position to a working position axially interposed between the flange elements 23a, 23b. The annular contrast element 43 is thus placed in radially outer position, preferably axially centred, around the carcass sleeve 19.

The annular contrast element 43 has an inner diameter $D_1$ greater than the diameter of the unshaped carcass sleeve 19 but smaller than an outer diameter that would be taken by the same carcass sleeve 19 on the action of the actuating devices 41, in the absence of the annular contrast element 43.

In an initial shaping step, by the effect of the pressure exerted by the operating fluid in conjunction with the axial approach of the flange elements 23a, 23b, the carcass sleeve 19 tends to expand, thus taking a cross-section profile substantially curved according to an arc of a circle. This initial transient lasts until the carcass sleeve 19, by expanding radially, does not come into contact with the radially inner surface 43a of the annular contrast element 43, as indicated by the dashed line in FIG. 5.

The contact initially takes place at an equatorial plane E equidistant from the flange elements 23a, 23b and from beads 6 of the carcass sleeve 19. As the shaping continues, the carcass sleeve 19 expands further, shaping against the radially inner surface 43a of the annular contrast element 43 and spontaneously adapting itself, as shown in FIG. 5, to a profile in cross-section of the same which is substantially straight or slightly curved, corresponding to that taken by the forming drum 30 in the second operational condition.

During the shaping, when the carcass sleeve 19 begins to expand radially, the radial expansion of the forming drum 30 can be controlled by rotating the threaded bar 37 on the action of the rotary feeder 41.

However, the outer surface of the forming drum 30 remains spaced from the carcass sleeve 19 during the expansion of the forming drum itself, at least before reaching the second radially expanded operational condition. In other words, the shaping of the carcass sleeve 19 is preferably performed in the absence of contact between the latter and the forming drum 30, at least until the forming drum 30 has reached the maximum radial expansion, upon reaching its second operational condition.

In a preferred exemplary embodiment, the inner diameter $D_1$ of the annular contrast element 43, found at the radially inner surface 43a thereof, is substantially equal to an outer diameter $D_2$ of the forming drum 30 in the second radially expanded operational condition, added to twice the thickness T of a radially outer portion of the shaped carcass sleeve 19.

Consequently, the radially outer surface S of the forming drum 30, upon reaching the second operational condition, stops in contact with the radially inner surface of the shaped carcass sleeve 19. At least in the vicinity of the axially outer portions of the carcass sleeve 19 with respect to the radially inner surface 43a of the annular contrast element 43, the coupling can be implemented following a slight radial contraction of the carcass sleeve 19, obtained for example by the effect of an elastic contraction of the same as a result of the discharge of the previous operating fluid introduced during the shaping.

In order to facilitate proper coupling of the lateral portions of the carcass sleeve 19 against the forming drum 30, it may also be contemplated that the flange elements 23a, 23b are axially inserted in radially inner position with respect to sectors 31 of the forming drum itself, after the latter has reached the second operating condition or when it is ending its expansion to reach it. The achievement of a coupling by radial contraction of the carcass sleeve 19 promotes uniform contact and absence of friction between the forming drum 30 and the inner surface of the carcass sleeve 19, both in the proximity of the areas in contact with the annular contrast element 43 and in the proximity of the areas of sidewalls 10 and shoulder (i.e. the transition areas between sidewalls 10 and tread band 9). The structural integrity of the carcass sleeve 19 is therefore preserved without inducing density variations in the distribution of the cords that make up the carcass ply or plies, and/or other structural distortions.

According to a further preferred exemplary embodiment, it may be contemplated that at the end of the shaping, the inner surface of the carcass sleeve 19 reaches a maximum diameter slightly greater than the maximum outer diameter $D_2$ reached by the outer surface S of the forming drum 30 in the second operational condition. In this case, the coupling of the carcass sleeve 19 on the forming drum 30, also at the radially outer areas thereof, can be obtained as a result of a slight elastic contraction of the carcass sleeve 19 itself, caused by the discharge of the operating fluid under pressure.

In order ensure proper contraction of the carcass sleeve 19 and/or prevent undesired detachments from the belt layers 8a, 8b optionally carried by the transfer ring 44, it is preferable that the radially outer surface S of the forming drum 30, upon reaching the second operational conditions, has a minimum distance not greater than 2 mm from the radially inner surface of the shaped carcass sleeve 19. This minimum distance is detectable in the equatorial plane E of the forming drum 30.

A further preferred exemplary embodiment includes a radial expansion action of the annular contrast element 43 carried out concurrently with the shaping of the carcass sleeve 19. To this end, it may be contemplated that said plates 46 are elastically supported with respect to the transfer ring 44, so that the radial expansion of the annular contrast element 43 can take place by elastic deformation of the same, under the thrust exerted by the circumferential sectors 31 of the forming drum 30 upon reaching the second operational condition, and/or by the pressure of the operating fluid within the carcass sleeve 19.

After the coupling, the flange elements 23a, 23b release the carcass sleeve 19 leaving it on the forming drum 30.

Carcass sleeve 19 and forming drum 30 in mutual coupling relation are adapted to be subjected to the action of at least one additional component application device 54 designed to build at least one additional component externally on the shaped carcass sleeve 19.

Preferably, a plurality of additional component building devices is provided (not shown), installed in a green tyre completion line 55 remote with respect to said shaping station 20.

In order to allow the transfer of the forming drum 30 to the green tyre completion line 55, it may be contemplated that the forming drum 30 bearing the carcass sleeve 19 is supported by mandrel 42 operating at the first end 32a of the central shaft 32, while the tailstock 52 disengages from the second end 32b. With a retraction of the first flange element 23a, the shaping station 20 is returned to the loading/unloading condition, thus freeing access to a first anthropomorphic robotic arm 56 or other suitable transfer devices, which in turn engages the forming drum 30 at the second end 32b of the central shaft 32.

The first robotic arm 56 transfers the forming drum 30 from the shaping station 20 to the green tire completion line 55.

The first robotic arm 56, or other manipulators (not shown) specifically provided in the green tyre completion line 55 further suitably moves the forming drum 30 in front of each of the additional component application devices 54. More in particular, a first additional component application device (not shown) may be arranged to make a third belt layer 8c to complete the belt structure 8, for example by dispensing at least one rubber cord or other elongated continuous reinforcement element of textile or metal material. The third belt layer 8c is therefore made by winding said elongated continuous reinforcement element according to circumferential axially adjacent turns 57 around the radially outer surface of the carcass sleeve 19 coupled to the expanded toroidal forming drum 30, while the latter is actuated in rotation and suitably moved by the first robotic arm 56.

A second additional component building device may comprise one or more coiling units (not shown), adapted to make a tread band in radially outer position to the belt structure 8. A third additional component application device 54, for example provided with one or more respective coiling units 58, may be designed to make sidewalls 10 against the axially opposite lateral portions of the carcass sleeve 19.

Each of said coiling units is designed to apply at least one continuous elongated element of elastomeric material according to circumferential covering turns 59, consecutively adjacent in mutual contact around the radially outer surface and/or against the lateral surfaces of the carcass sleeve 19, while the forming drum 30 is actuated in rotation and suitably moved to distribute said circumferential covering turns 59 according to a predefined scheme.

Further additional component application devices may be on occurrence provided, for example for possibly making the anti-abrasive inserts 7, sidewall reinforcement inserts 14 and/or elastomeric reinforcement elements 13, as well as for making other specific parts of the tread band and/or of sidewalls 10. During the application of the additional components, the stiffness of the forming drum 30 ensures stable positioning of the single circumferential belt turns 57 and/or covering turns 59 formed directly on the outer surface of the belt structure 8 and/or the shaped carcass sleeve 19, without any undesired deformations of the carcass sleeve 19 by the effect of stresses transmitted thereto during application. The stickiness of the green elastomeric material usually composing the carcass ply or plies 3 and/or the belt layers 8a, 8b, 8c inhibits undesired spontaneous and/or uncontrolled movements of the single circumferential turns 57, 59.

On occurrence, the radial containment action of the carcass sleeve 19 during the shaping may be entirely entrusted to the transfer ring 44. In this case, the green tyre completion line 55 may also include at least one belt structure application station (not shown) adapted to make the first and/or the second belt layer 8a, 8b, preferably by applying sequentially a plurality of strip-like elements consecutively arranged adjacent around the circumferential development of the carcass sleeve 19 supported by the forming drum 30.

The transfer of the forming drum 30 between the various additional component application devices 54 arranged in the green tyre completion line 55 may be carried out by the same first robotic arm 56, or by one or more additional anthropomorphic robotic arms or manipulators of a known type.

The built green tyre 2 is adapted to be removed from the forming drum 30, before being subjected to an optional vulcanisation treatment.

The invention claimed is:

1. A process for building tyres, including:
arranging a carcass sleeve including at least one carcass ply and a pair of annular anchoring structures;
arranging a toroidal forming drum in a first, radially contracted, operational condition, wherein the forming drum comprises a flattened outer surface;
arranging said carcass sleeve in a position radially external to said forming drum;
radially expanding the carcass sleeve according to an arched profile in cross section for toroidally shaping said carcass sleeve against at least one radially inner surface of an annular contrast element while said forming drum is positioned inside the carcass sleeve, wherein during said toroidally shaping the carcass sleeve is in a contactless relationship with the forming drum and wherein, after contacting the annular contrast element, a radial containment action is exerted on the carcass sleeve and controlled by the annular contrast element, whereby radial expansion of the carcass sleeve is inhibited to provide a flattened shaping profile of the carcass sleeve consistent with the geometry of the forming drum for subsequent coupling with the forming drum;
expanding said forming drum up to a second radially expanded, operational condition, wherein the toroidally shaped carcass sleeve is coupled to the forming drum in said second operational condition; and
arranging said forming drum, coupled to said carcass sleeve, in proximity of at least one application device of additional components externally to said carcass sleeve,
wherein shaping of the carcass sleeve is performed in the absence of contact between the carcass sleeve and the forming drum, at least until the forming drum has a reached a radial maximum of the second operational condition.

2. The process according to claim 1, further including arranging said annular contrast element in a radially outer position around said carcass sleeve, before the toroidally shaping the carcass sleeve.

3. The process according to claim 2, wherein said annular contrast element is arranged around the carcass sleeve after the forming drum has been coaxially inserted into the carcass sleeve.

4. The process according to claim 3, wherein at least part of an expansion of the forming drum is carried out concurrently with at least part of the toroidally shaping of the carcass sleeve.

5. The process according to claim 4, wherein the flattened outer surface of the forming drum remains spaced from the carcass sleeve during expansion of the forming drum, at least before reaching the radial maximum of the second operational condition.

6. The process according to claim 5, wherein upon the toroidally shaping, an inner surface of the carcass sleeve reaches a maximum sleeve diameter greater than a maximum drum diameter reached by the flattened outer surface of the forming drum in the radial maximum of the second operational condition.

7. The process according to claim 6, wherein upon reaching said radial maximum of the second operational condition, the flattened outer surface of the forming drum has, at least in an equatorial plane of the drum, a distance not greater than 2 mm from the at least one radially inner surface of the shaped carcass sleeve against the annular contrast element.

8. The process according to claim 7, wherein upon reaching said radial maximum of the second operational condition, a minimum distance between the flattened outer surface of the forming drum and the at least one radially inner surface of the shaped carcass sleeve against the annular contrast element is detectable at the equatorial plane of the forming drum.

9. The process according to claim 8, further including a radial expansion of the annular contrast element carried out concurrently with the toroidally shaping the carcass sleeve.

10. The process according to claim 9, wherein the radial expansion of the annular contrast element occurs through elastic deformation of the annular contrast element.

11. The process according to claim 9, wherein the annular contrast element includes at least one transfer ring.

12. The process according to claim 11, wherein said transfer ring is movable along a first translation axis and a second translation axis perpendicular thereto.

13. The process according to claim 12, wherein said transfer ring carries internally a plurality of pads circumferentially distributed and radially movable between a release condition and a gripping condition in which the pads are radially contracted.

14. The process according to claim 9, wherein the annular contrast element includes at least one belt layer.

15. The process according to claim 9, wherein the annular contrast element includes at least one belt layer engaged inside a transfer ring.

16. The process according to claim 1, further including arranging said annular contrast element by:
 forming at least one belt layer around an auxiliary drum;
 engaging a transfer ring around said at least one belt layer; and
 translating said transfer ring for removing said at least one belt layer from the auxiliary drum and positioning said annular contrast element around the carcass sleeve.

17. The process according to claim 16, wherein the forming said belt layer includes wrapping a band-like semi-finished product circumferentially around said auxiliary drum and butt-jointing opposite ends of said band-like semi-finished product.

18. The process according to claim 9, wherein said application device of additional components is installed in a green tyre completion line remote with respect to a shaping station where said toroidally shaping occurs.

19. The process according to claim 9, wherein said additional components include at least one belt layer applied in a radially outer position on the carcass sleeve.

20. The process according to claim 19, wherein the belt layer is made by sequential application of a plurality of strip-like elements consecutively adjacently arranged around a circumferential development of the carcass sleeve.

21. The process according to claim 9, wherein said additional components include at least one tread band applied in a radially outer position to the carcass sleeve.

22. The process according to claim 21, wherein the tread band is made by winding with at least one continuous elongated element of elastomeric material according to circumferential covering turns consecutively arranged adjacent around a radially outer surface of said carcass sleeve.

23. The process according to claim 9, wherein said additional components include at least one sidewall applied laterally against the carcass sleeve.

24. The process according to claim 23, wherein the sidewall is made by winding with at least one continuous elongated element of elastomeric material according to circumferential covering turns consecutively and adjacently arranged against a lateral surface of said carcass sleeve.

25. The process according to claim 9, wherein the carcass sleeve is made in at least one building station and subsequently transferred to a shaping station.

26. The process according to claim 9, wherein the shaping of the carcass sleeve is carried out by introducing an inflating operating fluid inside the carcass sleeve.

27. The process according to claim 9, wherein the shaping of the carcass sleeve occurs through mutual approach of a pair of flange elements coaxially facing each other and operationally engaging respective annular anchoring structures carried by respective axially opposite ends of the carcass sleeve.

28. The process according to claim 27, wherein the carcass sleeve is coaxially fitted around the forming drum arranged in a shaping station where said toroidally shaping occurs.

29. The process according to claim 28, wherein fitting the carcass sleeve around the forming drum includes:
 positioning the flange elements in a loading/unloading condition in which they are mutually spaced by an extent greater than an axial dimension of the unshaped carcass sleeve;
 engaging the forming drum coaxially to one of said flange elements;
 positioning the carcass sleeve coaxially between the flange elements;
 axially translating the carcass sleeve to arrange the carcass sleeve in an axially centred position with respect to the forming drum.

30. The process according to claim 27, wherein arranging said annular contrast element in a radially outer position around the carcass sleeve includes the following actions:
 positioning said annular contrast element coaxially between the flange elements;
 axially translating the annular contrast element to move the annular contrast element to a stand-by position laterally arranged with respect to said flange elements.

31. The process according to claim 30, wherein the annular contrast element is positioned coaxially to the flange elements laterally with respect to the forming drum, and axially translated away from the forming drum.

32. The process according to claim 1, wherein during toroidally shaping said carcass sleeve, the annular contrast element has an inner diameter smaller than an outer diameter that would be taken by the carcass sleeve in the absence of the annular contrast element.

33. The process according to claim 1, wherein the flattened outer surface of the forming drum has a curvature ratio of between zero and 0.15.

34. A process for building tyres, including:
arranging a carcass sleeve including at least one carcass ply and a pair of annular anchoring structures;
arranging a toroidal forming drum in a first, radially contracted, operational condition;
arranging said carcass sleeve in a position radially external to said forming drum;
fitting the carcass sleeve around the forming drum;
arranging an annular contrast element in a radially outer position around said carcass sleeve, then
toroidally shaping said carcass sleeve against at least one radially inner surface of an annular contrast element while said forming drum is positioned inside the carcass sleeve, wherein during said toroidally shaping the carcass sleeve is in a contactless relationship with the forming drum and is shaped for subsequent coupling with the forming drum by a radial containment action exerted on the carcass sleeve and controlled by the annular contrast element;
expanding said forming drum up to a second radially expanded, operational condition, wherein the toroidally shaped carcass sleeve is coupled to the forming drum in said second operational condition; and
arranging said forming drum, coupled to said carcass sleeve, in proximity of at least one application device of additional components externally to said carcass sleeve,
wherein fitting the carcass sleeve around the forming drum includes:
positioning flange elements in a loading/unloading condition in which they are mutually spaced by an extent greater than an axial dimension of the unshaped carcass sleeve;
engaging the forming drum coaxially between said flange elements;
positioning the carcass sleeve coaxially between the flange elements; and
axially translating the carcass sleeve to arrange the carcass sleeve in an axially centred position with respect to the forming drum, and
wherein arranging said annular contrast element in a radially outer position around the carcass sleeve includes the following actions:
positioning said annular contrast element coaxially between the flange elements; then
axially translating the annular contrast element away from the forming drum, to move the annular contrast element to a stand-by position laterally arranged with respect to said flange elements, before positioning the carcass sleeve coaxially between the flange elements, and then
axially moving the annular contrast element from the stand-by position to the radially outer position around said carcass sleeve, after the carcass sleeve has been positioned coaxially between the flange elements.

35. The process according to claim 34, wherein the forming drum comprises a flattened outer surface and radial expansion of the carcass sleeve is inhibited to provide a flattened shaping profile of the carcass sleeve consistent with the geometry of the forming drum for subsequent coupling with the forming drum.

36. The process according to claim 34, wherein shaping of the carcass sleeve is performed in the absence of contact between the carcass sleeve and the forming drum, at least until the forming drum has reached a radial maximum of the second operational condition.

37. The process according to claim 34, wherein
the forming drum comprises a flattened outer surface and radial expansion of the carcass sleeve is inhibited to provide a flattened shaping profile of the carcass sleeve consistent with the geometry of the forming drum for subsequent coupling with the forming drum, and
shaping of the carcass sleeve is performed in the absence of contact between the carcass sleeve and the forming drum, at least until the forming drum has reached a radial maximum of the second operational condition.

* * * * *